Sept. 7, 1954     A. G. BELL     2,688,516
FUEL INJECTOR
Filed Sept. 8, 1951     2 Sheets-Sheet 1
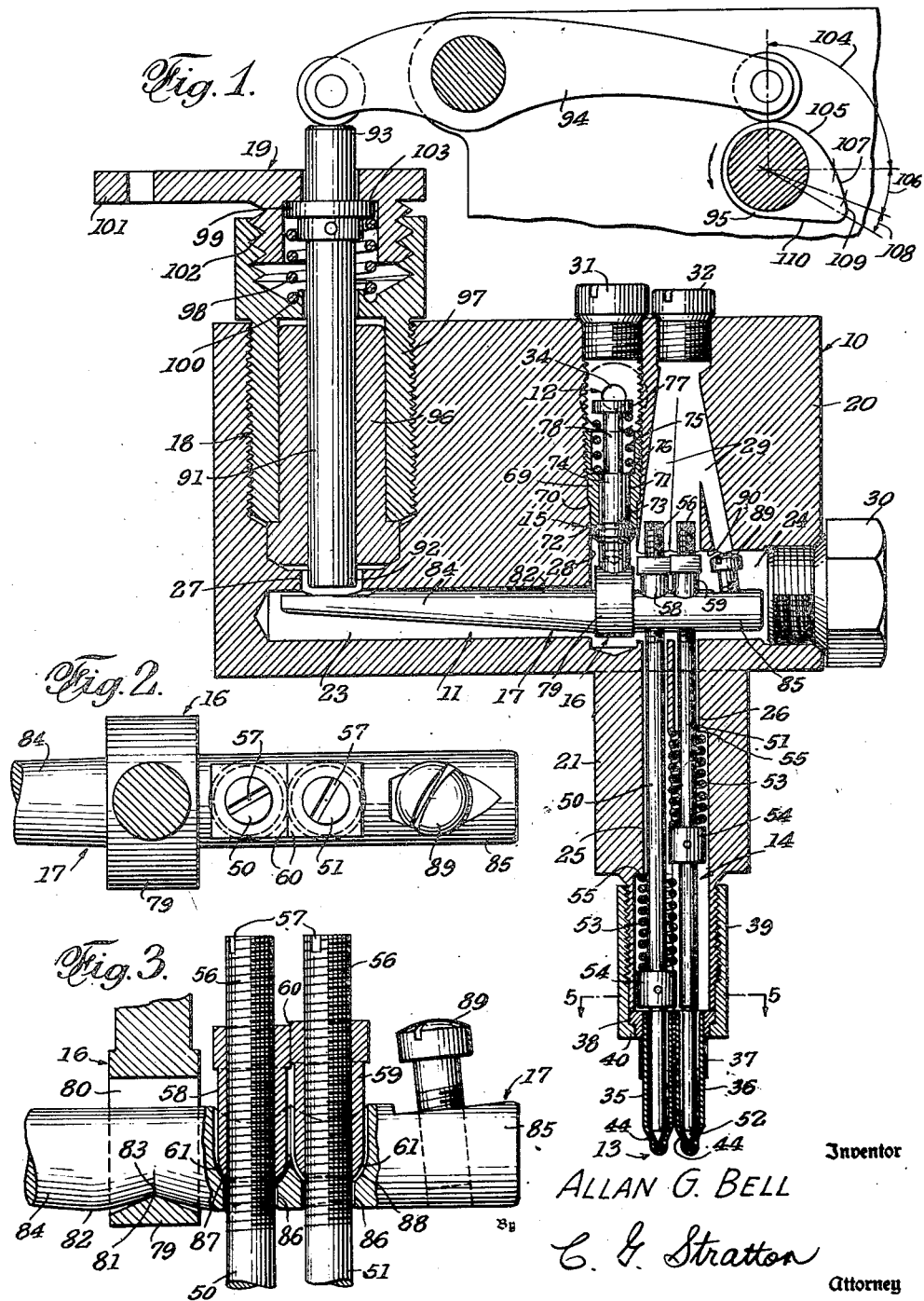
Inventor
ALLAN G. BELL
C. G. Stratton
Attorney

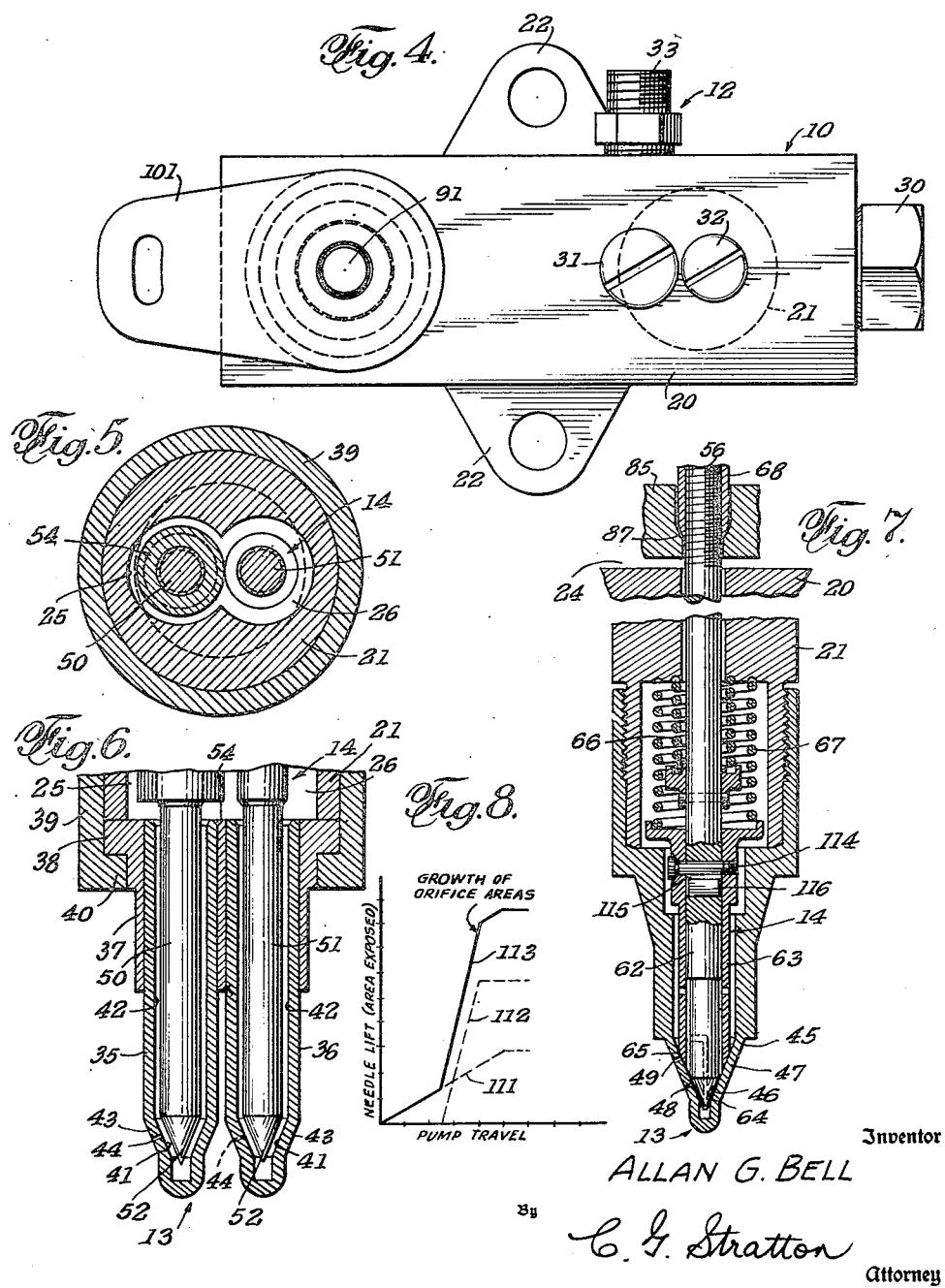

Patented Sept. 7, 1954

2,688,516

UNITED STATES PATENT OFFICE 2,688,516

FUEL INJECTOR

Allan G. Bell, Glendale, Calif.

Application September 8, 1951, Serial No. 245,707

11 Claims. (Cl. 299—107.2)

This invention relates to means for periodically discharging relatively small quantities of fluid at high pressure and deals more particularly with an injector for discharging a spray of liquid fuel into the combustion chamber of an internal combustion engine. While the present invention has many uses where high pressure injection of a liquid is required, the same is particularly adapted to inject fuel into the combustion chambers of diesel engines and the following disclosure is based on a fuel injector for diesel engines.

The quantity of fuel periodically discharged into the combustion chamber of a diesel engine is quite small being in the nature of a fraction of a drop which is disintegrated into a fine spray capable of ignition under temperatures induced by compression of the charge in the presence of air previously drawn into cylinder and combustion chamber. It is important that the fuel injection be accomplished under continuous high pressure to insure proper atomization. Also, that the charge be at a continuously increasing rate and have a sudden cutoff to obviate terminal droplets and the deleterious effects resulting therefrom. In other words, ideal fuel injection entails a gradually increasing spray that is instantly stopped prior to maximum compression.

The speed with which such fuel injection must be accomplished has in the past made it difficult to achieve ideal fuel injection and it is an object of the present invention to provide novel means for controlling the orifices through which a fuel charge passes into a combustion chamber so that ideal injection is more nearly approached.

While liquids have been considered to be incompressible, it has been demonstrated that under relatively high pressures, in the nature of 2000 to 6000 pounds per square inch, volatile liquids such as used as fuel, are compressible between 2% and 5% of the initial volume. The present invention makes use of this compressibility to create a high pressure in the injector while mechanically opening the spray orifices against this pressure and then utilizing the pressure loss that follows injection to suddenly stop injection, the same being followed by controlled replacement of the fuel that was discharged. Another object of the invention is to provide means to accomplish the foregoing.

Since the fuel charge is dependent in quantity on the load and/or speed of an engine, it is another object of the invention to provide plural controls for the injection orifices and to provide a time lag that enables either all or less than all of the orifices to open, as the case may be.

A more specific object of the invention is to provide a fuel injector that is provided with a fuel chamber having an inlet and an outlet, providing means to create pressure in the chamber to maintain said inlet and outlet closed, and providing improved means controlled by the pressure means that mechanically opens the outlet, the resultant pressure loss in the chamber allowing the inlet to open to replenish the fuel supply in said chamber.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiments of the present invention, which are given by way of illustration or example only.

In the drawings, like reference characters designate similar parts in the several views.

Fig. 1 is a longitudinal sectional view of a fuel injector embodying features of the present invention.

Fig. 2 is an enlarged fragmentary plan view of orifice controlling means employed in the invention.

Fig. 3 is a longitudinal sectional view of the means shown in Fig. 2.

Fig. 4 is a plan view of the fuel injector.

Fig. 5 is a plan sectional view as taken on line 5—5 of Fig. 1.

Fig. 6 is a vertical sectional view taken through the center of Fig. 5, the view being an enlargement of the lower right-hand portion of Fig. 1, but in an orifice-open position.

Fig. 7 is a view similar to Fig. 6 of a modification.

Fig. 8 is a graphic diagram showing the growth of orifice area obtained by the present means.

The fuel injector that is illustrated comprises, generally, a body 10 in which is provided a pressure chamber 11, a fuel inlet 12 and plural fuel outlet means 13, control valve means 14 for the outlets 13, spill and inlet valve means 15 for the inlet 12 and embodying a fulcrum 16, lever means 17 carried by said fulcrum and connected to valves 14, means 18 for both creating pressure in chamber 11 and actuating lever means 17, and means 19 for adjusting the operative movement of means 18.

The body 10 is shown as a metal block 20 having a projection 21 that is adapted to be directed toward the combustion chamber of an engine, ears 22 on the block serving as means to effect mounting of the body on the cylinder head of the engine. It is understood that outlets 13 terminate at or short of the combustion chamber.

Pressure chamber 11 is formed by an elongated bore 23 across the lower portion of block 20, a larger eccentric counterbore 24 extending from bore 23, bores 25 and 26 transverse to and opening into counterbore 24 and accommodating valve means 14, a bore 27 transverse to and opening into bore 22 and accommodating means 18, a bore 28 opening into counterbore 24 on the opposite side to bores 25 and 26 and accommodating valve means 15, and various bores 29, either converging at a common point as shown, or separated and opening into counterbore 24, said bores 29 constituting access openings for adjusting the action of lever means 17 and of control valves 14. Chamber 11, except as hereinafter described, is closed by a plug 30 at the end of counterbore 24, plug 31 at the end of bore 28, and plug 32 at the common end of bores 29.

Fuel inlet 12 is shown as a fitting 33 connected to a side of block 20 and opening in a port 34 in communication with bore 28. As will later be clear, fitting 33 is connected to a fuel source which is maintained under supply pressure so that fuel is always brought to inlet 12.

Fuel outlet means 13 is shown in Figs. 1, 5 and 6 as two bottom-closed housings 35 and 36 that extend from extension 21. Said housings are affixed, in side-by-side arrangement, in a fitting 37 that is provided with a flange 38. A collar 39, threadedly connected to extension 21, has a flange 40 that locks flange 38 to the end of extension 21. Mounted in this manner, means 13 is replaceably secured in position. The closed ends of housings 35 and 36 are provided with conical valve seats 41 above which extend fuel-conducting passages 42. The conical wall 43 of each valve seat is provided with one or more small orifices 44, the same being directed to spray fuel into a combustion chamber.

In the modification of Fig. 7, a single end-closed housing 45 is used instead of the two above described, the same having a conical seat 46 in the wall 47 of which is provided longitudinally spaced orifices 48 and 49, respectively comparable to orifices 44 of housings 42 and 43.

The control valve means 14 that is shown in Figs. 1, 5 and 6 comprises two stems 50 and 51 arranged in respective bores 25 and 26 and terminating in needle valves 52 operatively associated with seats 41, and, when engaged with said seats, closing orifices 44. Each stem 50, 51 is urged to orifice-closing position by an expansion spring 53 confined between a collar 54 on each stem and a shoulder 55 provided in each bore 25, 26. Springs 53 have considerable force which in practice is some forty pounds and it will be clear that the needle valves are raised from their seats against the force of the springs. The ends of stems 50 and 51 opposite to the needle valves 52 are provided with screw threads 56 and with end slots or the like 57, said threaded ends projecting transversely through chamber counterbore 24 and into bores 29 so that upon removal of plug 32, a suitable tool may be introduced into said bores 29 to rotationally adjust the stems. Stem 50 is provided with a nut 58 and stem 51 with a similar nut 59, said nuts being provided with flat-sided ends 60 that are engaged to mutually hold the nuts against rotation. Thus, the mentioned rotation of the stems longitudinally adjusts said nuts relatively so that they may be aligned or offset longitudinally, as desired. Each nut is provided with a semi-spherical end 61 substantially as shown.

The control valve means 14 shown in Fig. 7, instead of the side-by-side stems 50 and 51, comprises a stem 62 and a sleeve 63 therearound. The end of stem 62 is provided with a needle valve 64 that is operatively associated with seat 46 to control orifice 48 and sleeve 63 has a needle valve 65 also operatively associated with seat 46 to control orifice 49. An expansion spring 66 urges stem 62 in a direction to engage seat 46 and an expansion spring 67 urges sleeve 63 in the same direction, said springs 66 and 67 being comparable in function to springs 53. Only stem 62 extends into bores 24 and 29 as do stems 50 and 51, and the same has threads 56 and is fitted with a nut 68 similar to either nut 58 or 59.

While the drawings show two ways of providing two needle valve-controlled injection orifices, the same are intended as exemplary since more than two valves, whether side-by-side or concentric, may be provided. Also, each needle valve 52, 64 or 65 may control one or more orifices, as desired.

The spill and inlet valve means 15 comprises a fitting 69 threadedly positioned in bore 28 against a shoulder 70 provided in said bore. Said fitting has an axial passage 71 and, at its inner end, is provided with a conical valve seat 72. A valve 73 is associated with said seat and is integrally provided with a stem 74 loosely guided in passage 71. An expansion spring 75 is employed to urge valve 73 against its seat 72, the same being confined between an annular shoulder 76 on fitting 69 and the head 77 of a stem 78 threadedly connected to stem 74 of valve 73. It will be clear that fuel from inlet 12 can pass into chamber 11 past valve means 15 only when valve 73 is unseated.

The fulcrum 16 is shown as integral with valve 73 and comprises a ring 79 having its axis generally on the axis of counterbore 24. The opening 80 in said ring is large enough to provide adequate clearance for lever means 17 which extends therethrough. A teeter or knife-edge 81 is provided in ring 79 substantially as shown in Fig. 3.

The lever means 17 is shown as a lever 82 that is provided, intermediate its length, with a depression 83 receptive of edge 81, said depression and edge constituting a pivot or fulcrum for lever 82, which, while on its fulcrum, is a lever of the first class. The power arm 84 of said lever extends into operative engagement with means 18 and the work arm 85 is operatively connected to control valve means 14, the former arm being substantially longer than the latter.

As best seen in Fig. 3, stems 50 and 51 extend through holes 86 provided in arm 85 and ends 61 of nuts 58 and 59 operatively engage seats 87 and 88, respectively formed in said arm. It will be clear that depression of lever arm 84 results in raising of arm 85 and lifting of stems 50 and 51 against the force of their springs 53.

The outer end of lever arm 85 is provided with a screw or block 89 that is adjustable (access thereto being had through one of the bores 29) as desired to achieve contact with wall 90 of counterbore 24. Thus, when lever 82 is rocked on its fulcrum 81, 83, screw 89 will encounter wall 90 to constitute a new fulcrum for the lever which, thereby, becomes a lever of the second class. This new fulcrum being at one end of the lever, and the force provided by means 18 being at the other end, the valve 73 and ring 79 of valve means 15 are moved in a direction away from fitting 69 and inlet 12 is opened. This action will later be more fully described.

The means 18 is shown as a plunger 91 that has one end 92 operatively associated with the power arm 84 of lever means 17, and the opposite end 93 engaged with a rocker arm 94 controlled by a cam 95. Plunger 91 is accurately fitted in sleeve 96 that is tightly held in place by a nut 97 to insure against pressure and liquid leakage from chamber 11. It will be clear that rotation of cam 95 first projects plunger 91 into chamber 11 and then releases the plunger for retraction. Thus, the plunger intermittently engages lever arm 84 while increasing the pressure in said chamber.

The retractive movement of plunger 91 is caused by a spring 98 that is engaged between a collar 99 on the plunger and a seat 100 provided in nut 97.

The means 19 controls the stroke of plunger 91 and comprises an arm 101 connected to nut 97 by a coarse thread 102, the spring 98 normally urging collar 99 against face 103 of said arm. The position shown provides for maximum stroke of the plunger and it will be evident that inward adjustment of arm 101 will limit the retractive movement of the plunger accordingly.

The means 19 that is illustrated can be adjusted so that plunger end 92, by having greater or lesser displacement in chamber 11, controls or meters the amount of fuel that enters said chamber through valve 15. This simple design would serve for a single cylinder engine, but it would be somewhat cumbersome to provide such means for each cylinder of a multi-cylinder engine. Accordingly, in the latter case, arm 101 would be omitted or replaced by a fixed abutment and spring 98 reversed to urge plunger 91 into chamber 11. Thus, the spring would respond to pressure on end 92 of the plunger. By providing a metering variable-volume supply pump to feed each inlet 12 of a multi-cylinder engine, a metered quantity of fuel is introduced into the chamber 11 of each injector unit, each plunger 91 retracting accordingly since its retractive movement is a function of the displacement of the supply pump. Per se, the means 19 shown and the alternative above described are intended to disclose exemplary ways of replenishing chamber 11 after a discharge of fuel at outlet means 13 to restore a full charge of fuel to said chamber, since efficient operation depends on creating a high unit pressure in the chamber.

In the form shown, cam 95 is designed to first move plunger end 92 toward lever arm 84 without encountering said lever arm. This cam movement may extend through about 90°, as shown at 104, to cause this pressure-creating movement of the plunger by cam rise 105. A unit pressure approaching 4000 p. s. i. in chamber 11 can be achieved by this initial movement of the plunger. The next angular movement of the cam, as shown at 106, causes cam rise 107 to further project plunger 91 to rock lever means 17 on fulcrum 81, 83. This movement institutes lifting of needle valves 52 or 64 and 65, as the case may be. As orifices 44 or 48 and 49 achieve full open condition, screw 89 achieves contact with chamber wall 90. The next angular movement of the cam, as shown at 108, causes cam rise 109 to further project plunger 91 to rock lever 82 on its newly established fulcrum 89, 90, causing valve 73 to be unseated.

Since the second increment of movement of the plunger is the period during which the injection orifices are uncovered, the pressure in chamber 11 will, at high velocity, propel a charge of fuel through said orifices and the pressure in chamber 11 will drop or decay. Thus, when valve 73 is unseated, fuel from inlet 12 can enter chamber 11, and will do so upon the retraction of plunger 91 as permitted by cam 95. When lever 82 rocks on fulcrum 89, 90, the seats 87 and 88 thereof fall away from nuts 58 and 59, respectively, to thereby release stems 50 and 51 and allow springs 53 to return the needle valves to orifice-closing position.

It will be noted that the angular travel of cam rise 107 is relatively small and represents but a small fraction of a second in time that the needle valves are raised. The angular travel of cam rise 109 is still smaller so that instantly that the orifices are fully uncovered, lever 82 falls away and the needle valve closes suddenly.

As cam fall 110 allows plunger 91 to retract by displacement thereof of fuel entering chamber 11, there is no appreciable increase in pressure in said chamber which remains at about the pressure of the fuel supply connected to inlet 12. When plunger 91 is fully retracted, taking into account adjusting means 19, the pressure in chamber 11 is substantially balanced by the pressure in inlet 12. Thus, spring 75 will seat valve 73.

When an engine is under full load it requires more fuel than when under a lesser load or when idling. This variable full charge is difficult to obtain with a single jet or orifice and yet retain an increasing rate of fuel discharge. In the present case, the plural outlets provide for one opening under idling conditions and both (or more, if more than two outlets are used) under load conditions. To this end, one stem—the stem 50—is raised before the other stem 51. In Fig. 8, graph line 111 represents the growth of the area of orifice 44 in housing 35 as the needle valve of stem 50 is raised, and graph line 112 represents the growth of the area of orifice 44 in housing 36 as the needle valve of stem 51 is raised.

By adjusting nut 59 to have lost-motion engagement with seat 88, as shown in Fig. 3, one orifice 44 will open first and then the other, and, finally, both orifices will be open together. This results in a growth of both orifices that is represented by graph line 113. For two and one-half units of travel of pump or plunger 91, one orifice increasingly opens. This represents a relatively small amount of fuel discharge. Then, as said one orifice continues to increase in effective size, the other orifice begins to open and the two orifices combine to give the increasing rate of growth size suggested by line 13. Finally, as lever 82 falls away to release stems 50 and 51, springs 53 suddenly close both orifices simultaneously.

When the engine is idling, arm 101 is adjusted to limit the recovery or retractive stroke of plunger 91 which, therefore, has an initial fuel compressing stroke that is proportionally smaller. This creates a lesser pressure in chamber 11 than the 4000 p. s. i. created by a full stroke. Consequently, when stem 50 is lifted, the fuel injection is in smaller quantity by reason of such lower injection pressure. Also, the time of the angular cam movement 106 is greater than before. During this time, the decay of pressure in chamber 11 is such that valve 15 will open before lever 82 has had an opportunity to raise stem 51 and said lever will fall away as fulcrum ring 79 falls away with valve 73. In any case, this decay of pressure allows spring 53 of stem 51 to hold the needle valve thereof closed even if valve 73 remains seated. In other words, the force of said spring 53 of stem 51 overcomes the pressure holding valve 73 seated and lever 82 falls away without opening the second orifice.

In Fig. 7, the lost motion at 61, 88 has its counterpart in a transverse screw 114 carried by sleeve 63 and operating in a slot 115 in stem 62. A gauge block 116 gauges the amount of lost motion. In all other respects the modification of Fig. 7 is like and functions in the same manner as the fully described form of injector.

While the invention that has been illustrated and described is now regarded as the preferred embodiments, the construction is, of course, subject to modifications without departing from the spirit and scope of the invention. It is, therefore, not desired to restrict the invention to the particular forms of construction illustrated and described, but to cover all modifications that may fall within the scope of the appended claims.

Having thus described the invention, what is claimed and desired to be secured by Letters Patent is:

1. In a fuel injector, a body having a fuel chamber therein, an outlet for the fuel in said chamber comprising at least two valve-controlled orifices, plunger means to place the fuel in said chamber under pressure, lever means movable by the mentioned means and disposed within said chamber and connected to the valves controlling said orifices to move said valves to successively uncover said orifices while the fuel in said chamber is maintained under pressure by the plunger means, a movable spring-biased fulcrum for the lever means held in one position by said fuel pressure and while the orifices are opening, and spring means effective upon decay of pressure in the fuel chamber that results from discharge of fuel through said orifices to move said valves to close said orifices and simultaneously move the spring-biased fulcrum to release the lever to move with said valves when closing.

2. The fuel injector according to claim 1: the mentioned valves being arranged in side-by-side relationship.

3. The fuel injector according to claim 1: the mentioned valves being concentrically arranged.

4. In a fuel injector, a body having a fuel chamber therein, said chamber having a valve-controlled inlet and a valve-controlled outlet, resilient means urging the valves of said inlet and outlet closed, a plunger having an end movable into the chamber to apply pressure upon the fuel in the chamber and said pressure supplementing the force of the resilient means to hold said valves closed, and means disposed within the chamber and engaged with and moved by said plunger end, said means being operatively connected to both the inlet and outlet valves to open the latter when moved by the plunger end and against the pressure in the chamber and to open the former against the force of the resilient means upon decay of the pressure in the chamber that results from opening of the outlet valve.

5. In a fuel injector, a body having a fuel chamber therein, said chamber having a valve-controlled inlet and a valve-controlled outlet, resilient means urging the valves of said inlet and outlet closed, a plunger having an end movable into the chamber to apply pressure upon the fuel in the chamber and said pressure supplementing the force of resilient means to hold said valves closed, and means disposed within the chamber and engaged with and moved by said plunger end, said means being operatively connected to both the inlet and outlet valves to open the latter when moved by the plunger end and against the pressure in the chamber and to open the former against the force of the resilient means upon decay of the pressure in the chamber that results from opening of the outlet valve, said means comprising a lever having one end in the path of movement of the plunger and the other end connected to the outlet valve, and a fulcrum element carried by the inlet valve and engaged with the lever intermediate its ends.

6. In a fuel injector, a body having a fuel chamber therein, said chamber having a valve controlled inlet and a valve-controlled outlet, resilient means urging the valves of said inlet and outlet closed, a plunger having an end movable into the chamber to apply pressure upon the fuel in the chamber and said pressure supplementing the force of the resilient means to hold said valves closed, means disposed within the chamber and engaged with and moved by said plunger end, said means being operatively connected to both the inlet and outlet valves to open the latter when moved by the plunger end and against the pressure in the chamber and to open the former against the force of the resilient means, said means comprising a lever having one end in the path of movement of the plunger and the other end connected to the outlet valve, a fulcrum element carried by the inlet valve and engaged with the lever intermediate its end, and an adjustable member in the outer end of said other end of the lever and adapted to engage a wall of the chamber to constitute a fulcrum for the lever upon opening movement of the inlet valve and fulcrum element.

7. In a fuel injector, two fuel injection valves, a lever having a power arm and a work arm, a pivot for said lever, plunger means to rock the lever on its pivot, an abutment connection between the work arm and one of said valves to move said valve to open position upon rocking of the lever by the plunger means, a lost motion abutment connection between said work arm and the other valve to move said other valve to open position sequentially to the movement of the first valve, spring means to return both valves to closed position upon release thereof by the lever, a pressure chamber in which said lever, pivot and valves reside and said plunger means being arranged to move into said chamber to increase pressure therein.

8. In a fuel injector, two fuel injection valves, a lever having a power arm and a work arm, a pivot for said lever, plunger means to rock the lever on its pivot, an abutment connection between the work arm and one of said valves to move said valve to open position upon rocking of the lever by the plunger means, a lost motion abutment connection between said work arm and the other valve to move said other valve to open position sequentially to the movement of the first valve, spring means to return both valves to closed position upon release thereof by the lever, said lever, pivot and valves residing in a pressure chamber and said plunger means moving into said chamber to increase pressure therein, and a spring-biased inlet valve for said chamber and held closed by said spring and the pressure in the chamber, said inlet valve being connected to the pivot and moving to open position against the bias spring upon release of pressure in the chamber that follows opening of the fuel injection valves, said opening movement of the inlet valve moving the lever pivot to allow the lever to release the injection valves.

9. In a fuel injector, two fuel injection valves, a lever having a power arm and a work arm, a pivot for said lever, plunger means to rock the lever on its pivot, an abutment connection between the work arm and one of said valves to move said valve to open position upon rocking of the lever by the plunger means, a lost motion abutment connection between said valve and the other injection valve to move said other valve to open position sequentially to the movement of the first valve, spring means to return both valves to closed position upon release thereof by the lever, and a pressure chamber in which said lever, pivot, spring means and valves reside and said plunger means moving into said chamber to increase pressure therein and rocking the lever to move the valves to open position sequentially during such increase of pressure.

10. In a fuel injector, two fuel injection valves, a lever having a power arm and a work arm, a pivot for said lever, plunger means to rock the lever on its pivot, an abutment connection between the work arm and one of said valves to move said valve to open position upon rocking of the lever by the plunger means, a lost motion abutment connection between said valve and the other injection valve to move said other valve to open position sequentially to the movement of the first valve, spring means to return both valves to closed position upon release thereof by the lever, a pressure chamber in which said lever, pivot, spring means and valves reside and said plunger means moving into said chamber to increase pressure therein, and an inlet valve for said chamber and held closed by the bias spring and the pressure in the chamber, said inlet valve being connected to the pivot and moving to open position against the bias spring upon release of pressure that follows opening of the fuel injection valves, said opening movement of the inlet valve moving the lever pivot to allow the lever to release the injection valves.

11. In a fuel injector, a body having a fuel chamber therein, an outlet for the fuel in the chamber comprising at least two orifices, the combined area of said orifices constituting the maximum outlet of said chamber, a valve controlling each of said orifices, means to place the fuel in said chamber under pressure while said valves are positioned to close the respective orifices, and fulcrumed means movable by the mentioned means and disposed within said chamber and operatively connected to said valves to move the same successively to uncover the orifices successively to, thereby vary and increasingly enlarge the effective area of the outlet from closed maximum size.

References Cited in the file of this patent

UNITED STATES PATENTS

| Number | Name | Date |
|---|---|---|
| 1,897,290 | Wuterich | Feb. 14, 1933 |

FOREIGN PATENTS

| Number | Country | Date |
|---|---|---|
| 141,681 | Great Britain | Mar. 11, 1920 |
| 340,202 | Germany | Sept. 3, 1921 |